(12) United States Patent
Hubbard et al.

(10) Patent No.: US 7,831,638 B2
(45) Date of Patent: Nov. 9, 2010

(54) METHOD AND SYSTEM FOR IMAGE MANAGEMENT IN A COMPUTING SYSTEM

(75) Inventors: Edward A. Hubbard, Round Rock, TX (US); Sean D. Glynn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 12/564,116

(22) Filed: Sep. 22, 2009

(65) Prior Publication Data

US 2010/0011204 A1 Jan. 14, 2010

Related U.S. Application Data

(63) Continuation of application No. 11/159,529, filed on Jun. 23, 2005, now Pat. No. 7,613,733, which is a continuation of application No. 10/745,175, filed on Dec. 23, 2003, now Pat. No. 6,912,552, which is a continuation of application No. 09/378,020, filed on Aug. 19, 1999, now Pat. No. 6,760,708.

(51) Int. Cl.
*G06F 17/30* (2006.01)
(52) U.S. Cl. .................... 707/809; 707/915; 713/2
(58) Field of Classification Search ............... 707/809, 707/912, 915, 999.107; 713/2; 715/748, 715/749
See application file for complete search history.

(56) References Cited

U.S. PATENT DOCUMENTS

| | | | | |
|---|---|---|---|---|
| 4,253,178 A | 2/1981 | Kolaczia | .................... | 368/285 |
| 4,356,545 A | 10/1982 | West | ......................... | 714/46 |
| 4,438,458 A | 3/1984 | Munscher | ................... | 348/838 |
| 4,491,914 A | 1/1985 | Sujaku | ........................ | 714/38 |
| 4,627,060 A | 12/1986 | Huang et al. | .................. | 714/36 |
| 4,635,187 A | 1/1987 | Baron et al. | ................. | 718/100 |
| 4,788,658 A | 11/1988 | Hanebuth | .................... | 361/684 |
| 4,809,280 A | 2/1989 | Shonaka | ....................... | 714/55 |
| 4,916,699 A | 4/1990 | Ohashi | ........................ | 714/46 |
| 4,964,077 A | 10/1990 | Eisen et al. | ................. | 345/707 |
| 5,010,551 A | 4/1991 | Goldsmith et al. | ............ | 717/46 |
| 5,017,030 A | 5/1991 | Crews | ........................ | 400/485 |

(Continued)

FOREIGN PATENT DOCUMENTS

GB 2065939 7/1981

(Continued)

OTHER PUBLICATIONS

CNET.com "IBM to Get Colorful with New Notebooks" at Internet >http://news.cnet.com/news/0-1003-200-296049.html?tag=st.cn.1fd2.<, printed Oct. 6, 1999.

(Continued)

*Primary Examiner*—Cheryl Lewis
(74) *Attorney, Agent, or Firm*—Baker Botts L.L.P.

(57) ABSTRACT

A method and system for migrating data to a build-to-order computing system is provided. The method comprises storing an image at a remote site. The image comprises data stored on a computing system. An order is received to provide a second computing system to a customer. Access to the image is provided to the second computing system such that the second computing system can store the image.

20 Claims, 3 Drawing Sheets

U.S. PATENT DOCUMENTS

| | | | |
|---|---|---|---|
| 5,060,135 A | 10/1991 | Levine et al. | 345/769 |
| 5,196,993 A | 3/1993 | Herron et al. | 361/681 |
| 5,214,695 A | 5/1993 | Arnold et al. | 713/2 |
| 5,224,024 A | 6/1993 | Tu et al. | 361/831 |
| 5,228,655 A | 7/1993 | Garcia et al. | 248/118 |
| 5,276,805 A | 1/1994 | Hamaguchi | 345/537 |
| 5,287,448 A | 2/1994 | Nicol et al. | 345/707 |
| 5,287,505 A | 2/1994 | Calvert et al. | 707/10 |
| 5,325,521 A | 6/1994 | Koyama et al. | 704/55 |
| 5,346,410 A | 9/1994 | Moore, Jr. | 439/607 |
| 5,348,408 A | 9/1994 | Gelardi et al. | 400/715 |
| 5,353,240 A | 10/1994 | Mallory et al. | 702/186 |
| 5,355,357 A | 10/1994 | Yamamori et al. | 369/75.2 |
| 5,356,099 A | 10/1994 | Sereboff | 248/118.1 |
| 5,367,667 A | 11/1994 | Wahlquist et al. | 714/32 |
| 5,374,018 A | 12/1994 | Daneshvar | 248/118 |
| 5,375,800 A | 12/1994 | Wilcox et al. | 248/118.1 |
| 5,381,526 A | 1/1995 | Ellson | 345/530 |
| 5,388,032 A | 2/1995 | Gill et al. | 700/17 |
| 5,390,324 A | 2/1995 | Burckhartt et al. | 714/23 |
| 5,392,095 A | 2/1995 | Siegel | 399/8 |
| 5,398,333 A | 3/1995 | Schieve et al. | 714/36 |
| 5,410,447 A | 4/1995 | Miyagawa et al. | 361/681 |
| 5,422,751 A | 6/1995 | Lewis et al. | 349/59 |
| 5,423,605 A | 6/1995 | Liu | 312/265.6 |
| 5,432,927 A | 7/1995 | Grote et al. | 713/2 |
| 5,443,237 A | 8/1995 | Stadtmauer | 248/441.1 |
| 5,450,576 A | 9/1995 | Kennedy | 713/2 |
| 5,454,080 A | 9/1995 | Fasig et al. | 710/352 |
| 5,455,933 A | 10/1995 | Schieve et al. | 714/27 |
| 5,471,674 A | 11/1995 | Stewart et al. | 713/2 |
| 5,483,437 A | 1/1996 | Tang | 363/146 |
| 5,503,484 A | 4/1996 | Louis | 400/489 |
| 5,513,319 A | 4/1996 | Finch et al. | 714/52 |
| 5,522,572 A | 6/1996 | Copeland et al. | 248/118 |
| 5,526,180 A | 6/1996 | Rausnitz | 359/609 |
| 5,530,847 A | 6/1996 | Schieve et al. | 714/38 |
| 5,537,585 A | 7/1996 | Blickenstaff et al. | 707/205 |
| 5,537,618 A | 7/1996 | Boulton et al. | 345/745 |
| 5,547,154 A | 8/1996 | Kirchhoff et al. | 248/118.3 |
| 5,547,272 A | 8/1996 | Paterson et al. | 312/223.2 |
| 5,564,054 A | 10/1996 | Bramnick et al. | 713/2 |
| 5,592,362 A | 1/1997 | Ohgami et al. | 361/686 |
| 5,596,481 A | 1/1997 | Liu et al. | 361/683 |
| 5,596,482 A | 1/1997 | Horikoshi | 361/683 |
| 5,627,964 A | 5/1997 | Reynolds et al. | 714/46 |
| 5,649,200 A | 7/1997 | Leblang et al. | 717/122 |
| 5,668,992 A | 9/1997 | Hammer et al. | 713/1 |
| 5,678,002 A | 10/1997 | Fawcett et al. | 345/709 |
| 5,680,640 A | 10/1997 | Ofek et al. | 710/19 |
| 5,689,253 A | 11/1997 | Hargreaves et al. | 341/22 |
| 5,689,706 A | 11/1997 | Rao et al. | 707/201 |
| 5,694,293 A | 12/1997 | Seto et al. | 361/687 |
| 5,708,776 A | 1/1998 | Kikinis | 714/55 |
| 5,708,812 A | 1/1998 | Van Dyke et al. | 717/171 |
| 5,724,224 A | 3/1998 | Howell et al. | 361/680 |
| 5,727,163 A | 3/1998 | Bezos | 705/27 |
| 5,732,268 A | 3/1998 | Bizzarri | 713/2 |
| 5,748,877 A | 5/1998 | Dollahite et al. | 714/36 |
| 5,759,644 A | 6/1998 | Stanley | 428/14 |
| 5,768,370 A | 6/1998 | Maatta et al. | 379/433 |
| 5,775,822 A | 7/1998 | Cheng | 400/489 |
| 5,778,372 A | 7/1998 | Cordell et al. | 707/100 |
| 5,790,796 A | 8/1998 | Sadowsky | 709/22.1 |
| 5,796,579 A | 8/1998 | Nakajima et al. | 361/683 |
| 5,797,281 A | 8/1998 | Fox | 63/12 |
| 5,803,416 A | 9/1998 | Hanson et al. | 248/118 |
| 5,805,882 A | 9/1998 | Cooper et al. | 713/2 |
| 5,809,248 A | 9/1998 | Vidovic | 709/219 |
| 5,809,511 A | 9/1998 | Peake | 707/204 |
| 5,818,635 A | 10/1998 | Hohn et al. | 359/612 |
| 5,819,274 A | 10/1998 | Jackson, Jr. | 707/10 |
| 5,825,355 A | 10/1998 | Palmer et al. | 345/712 |
| 5,825,506 A | 10/1998 | Bednar et al. | 358/402 |
| 5,826,839 A | 10/1998 | Chen | 248/118 |
| 5,832,522 A | 11/1998 | Blickenstaff et al. | 707/204 |
| 5,835,344 A | 11/1998 | Alexander | 361/683 |
| 5,845,136 A | 12/1998 | Babcock | 713/300 |
| 5,852,545 A | 12/1998 | Pan-Ratzlaff | 361/683 |
| 5,854,828 A | 12/1998 | Kocis et al. | 379/93.31 |
| 5,860,001 A | 1/1999 | Cromer et al. | 713/1 |
| 5,860,002 A | 1/1999 | Huang | 713/2 |
| 5,860,012 A | 1/1999 | Luu | 713/175 |
| 5,861,884 A | 1/1999 | Fujioka | 345/338 |
| 5,881,236 A | 3/1999 | Dickey | 709/221 |
| 5,884,073 A | 3/1999 | Dent | 713/2 |
| 5,894,571 A | 4/1999 | O'Connor | 713/2 |
| 5,904,327 A | 5/1999 | Cheng | 248/118.1 |
| 5,905,632 A | 5/1999 | Seto et al. | 361/683 |
| 5,906,506 A | 5/1999 | Chang et al. | 439/500 |
| 5,909,544 A | 6/1999 | Anderson, II et al. | 709/208 |
| 5,939,694 A | 8/1999 | Holcomb et al. | 235/381 |
| 5,953,533 A | 9/1999 | Fink et al. | 717/175 |
| 5,955,797 A | 9/1999 | Kim | 307/150 |
| 5,960,189 A | 9/1999 | Stupek, Jr. et al. | 717/169 |
| 5,960,204 A | 9/1999 | Yinger et al. | 717/176 |
| 5,960,411 A | 9/1999 | Hartman et al. | 705/26 |
| 5,963,743 A | 10/1999 | Amberg et al. | 717/174 |
| 5,974,546 A | 10/1999 | Anderson | 713/2 |
| 5,978,911 A | 11/1999 | Knox et al. | 713/1 |
| 5,983,369 A | 11/1999 | Bakoglu et al. | 714/46 |
| 5,991,543 A | 11/1999 | Amberg et al. | 717/175 |
| 5,995,757 A | 11/1999 | Amberg et al. | 717/175 |
| 6,006,344 A | 12/1999 | Bell, Jr. | 714/37 |
| 6,012,154 A | 1/2000 | Poisner | 714/55 |
| 6,014,744 A | 1/2000 | McKaughan et al. | 713/2 |
| 6,023,267 A | 2/2000 | Chapuis et al. | 345/327 |
| 6,029,257 A | 2/2000 | Palmer | 714/40 |
| 6,029,258 A | 2/2000 | Ahmad | 714/46 |
| 6,032,157 A | 2/2000 | Tamano et al. | 707/104 |
| 6,034,869 A | 3/2000 | Lin | 361/686 |
| 6,038,597 A | 3/2000 | Van Wyngarden | 709/219 |
| 6,047,261 A | 4/2000 | Siefert | 705/11 |
| 6,049,342 A | 4/2000 | Nielsen et al. | 345/473 |
| 6,049,454 A | 4/2000 | Howell et al. | 361/686 |
| 6,050,833 A | 4/2000 | Danzyger et al. | 439/92 |
| 6,056,136 A | 5/2000 | Taber et al. | 215/252 |
| 6,061,788 A | 5/2000 | Reynaud et al. | 713/2 |
| 6,061,810 A | 5/2000 | Potter | 714/23 |
| 6,065,136 A | 5/2000 | Kuwabara | 714/31 |
| 6,104,874 A | 8/2000 | Branson et al. | 395/702 |
| 6,108,697 A | 8/2000 | Raymond et al. | 709/218 |
| 6,112,320 A | 8/2000 | Dien | 714/51 |
| 6,113,050 A | 9/2000 | Rush | 248/346.01 |
| 6,166,729 A | 12/2000 | Acosta et al. | 345/327 |
| 6,167,383 A | 12/2000 | Henson | 705/26 |
| 6,167,532 A | 12/2000 | Wisecup | 714/23 |
| 6,170,065 B1 | 1/2001 | Kobata et al. | 714/7 |
| 6,182,212 B1 | 1/2001 | Atkins et al. | 713/1 |
| 6,182,275 B1 | 1/2001 | Beelitz et al. | 717/1 |
| 6,199,204 B1 | 3/2001 | Donohue | 717/11 |
| 6,202,207 B1 | 3/2001 | Donohue | 717/11 |
| 6,226,412 B1 | 5/2001 | Schwab | 382/232 |
| 6,236,901 B1 | 5/2001 | Goss | 700/95 |
| 6,247,126 B1 | 6/2001 | Beelitz et al. | 713/1 |
| 6,256,620 B1 | 7/2001 | Jawahar et al. | 707/2 |
| 6,263,215 B1 | 7/2001 | Patton et al. | 455/561 |
| 6,272,484 B1 * | 8/2001 | Martin et al. | 1/1 |
| 6,279,109 B1 * | 8/2001 | Brundridge | 713/2 |
| 6,279,125 B1 | 8/2001 | Klein | 714/38 |
| 6,279,156 B1 | 8/2001 | Amberg et al. | 717/11 |
| 6,298,443 B1 | 10/2001 | Colligan et al. | 713/200 |
| 6,298,457 B1 | 10/2001 | Rachlin et al. | 714/49 |
| 6,331,936 B1 | 12/2001 | Hom et al. | 361/686 |

| | | | | |
|---|---|---|---|---|
| 6,356,977 B2 | 3/2002 | Ofek et al. | | 711/112 |
| 6,367,035 B1 | 4/2002 | White | | 714/40 |
| 6,385,737 B1 | 5/2002 | Benignus et al. | | 714/22 |
| 6,393,586 B1 | 5/2002 | Sloan et al. | | 714/25 |
| 6,449,735 B1 | 9/2002 | Edwards et al. | | 714/25 |
| 6,741,737 B1 | 5/2004 | Lenoir | | 382/176 |
| 6,760,708 B1 * | 7/2004 | Hubbard et al. | | 705/27 |
| 6,912,552 B2 * | 6/2005 | Hubbard et al. | | 1/1 |
| 7,565,650 B2 * | 7/2009 | Bhogal | | 717/178 |
| 7,613,733 B2 * | 11/2009 | Hubbard et al. | | 1/1 |
| 2006/0229951 A1 * | 10/2006 | Abels et al. | | 705/26 |

FOREIGN PATENT DOCUMENTS

| | | |
|---|---|---|
| GB | 2329266 | 3/1999 |
| GB | 2356271 | 5/2001 |
| WO | WO 93/00628 | 1/1993 |
| WO | WO 94/08289 | 4/1994 |
| WO | WO 97/09676 | 3/1997 |
| WO | WO 98/18086 | 4/1998 |

OTHER PUBLICATIONS

"HP builds in Net button" at Internet <http://news.cnet.com/news/0-1003-202-316545.html>, printed Oct. 18, 1999.

Compaq Computer Corporation Press Release "New PCs Offer Equipment Colour and Personality; Compaq's Presario Range Opened Up for Customisation" at Internet >http://biz.yahoo.com/prnews/000719/compaq_new.html<, printed Jul. 24, 2000.

Compaq Computer Corporation "Home and Home Office Computing My Style" at internet >wysiwyg://3/http://athome.compaq.com/showroom/static/splash.asp<, printed Jul. 18, 2000.

Radio Shack advertisement p. 2, Aug. 20, 2000.

Epson "Epson Stylus Color 74i It makes a Colorful Case for Being Your iMac Printer" at Internet >http://www.epson.com/printer/inkjet/sty740i.html<, printed Jul. 24, 2000.

"Packard Bell PCs provide state-of-the-art technology and complete user support" at <http://www.gadgetguru.com.html>, printed Oct. 18, 1999.

@Backup Company "@Backup Company Information Page" at Internet http://security.atbackup.com/VID101.3.819255.0/Company.htm, Printed Jun. 15, 1999.

@Backup Company "@Backup Company Frequently Asked Questions" at Internet http://security.atbackup.com/VID101.3.819255.0/FAQ.asp, Printed Jun. 15, 1999.

@Backup Company "Frequently Asked Questions: Technical" at Internet http://security.atbackup.com/VID101.3.819255.0/Tech.asp, Printed Jun. 15, 1999.

@Backup Company "Are You Protected" at Internet http://security.atbackup.com/VID101.3.819255.0/Main.asp, Printed Jun. 15, 1999.

3Com "Palm Computer News and Promotions" at Internet >http://www.palm.com/pr/holidaydebut.html< printed Oct. 5, 1999.

Exploring Windows NT "ZD Journals" at Internet>http://www.zdjournals.com/9802.ewn9821.html<, printed Oct. 18, 1999.

PCWorld News "Compaq Debuts Home PCs" at Internet >http://www2.pcworld.com.html<, printed Oct. 18, 1999.

Pending U.S. Appl. No. 09/236862: Alan E. Beelitz Richard D. Amberg; "Recoverable Software Installation Process and Apparatus for a Computer System"; Dell USA L.P., filed Jan. 25, 1999.

Great Britain Search Report 0019866.3, Mar. 12, 2001.

Wilson et al., "Knowledge based interface to manufacturing computer system," ACM pp. 1183-1189, 1988.

Green, "Component based software development: implications for documentation", ACM pp. 159-164, 1999.

Hall et al., "A Cooperative approach to support software deployment using software dock", ACM ICSE pp. 174-183, 1999.

* cited by examiner

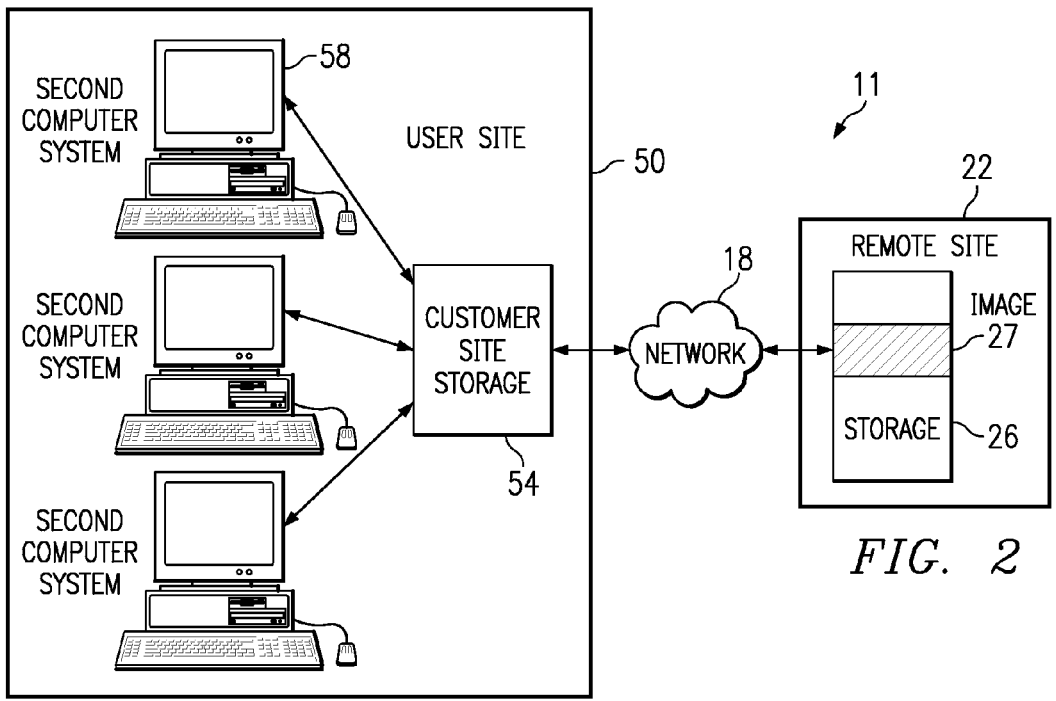
FIG. 2
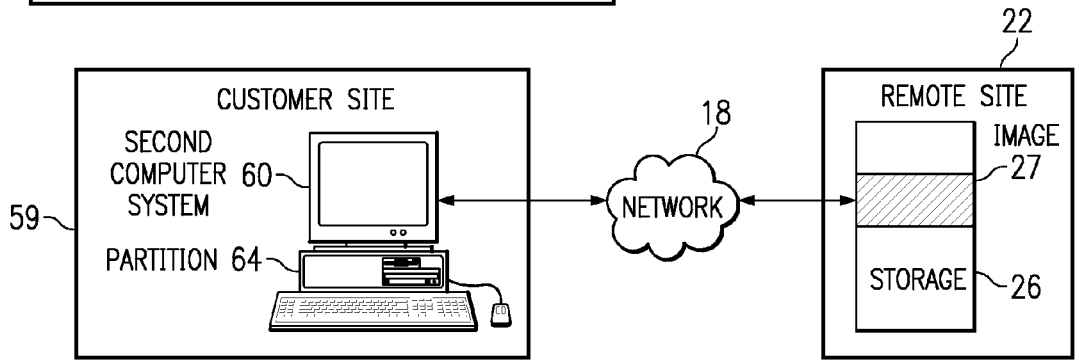
FIG. 3
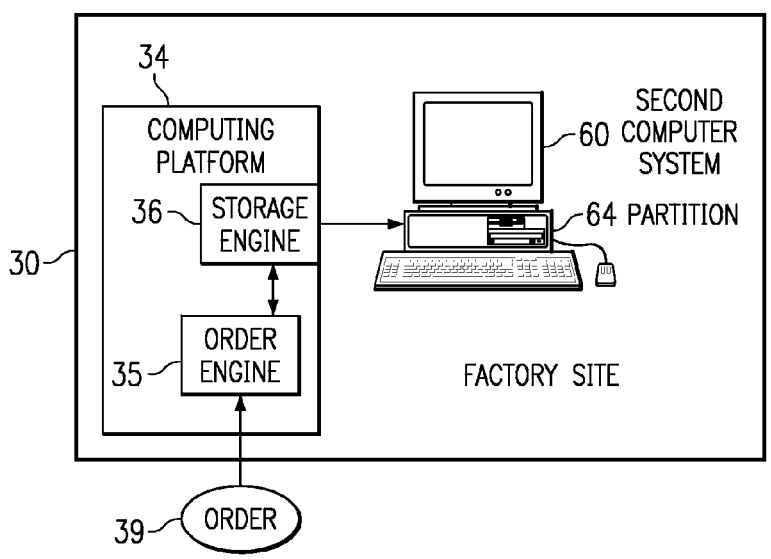

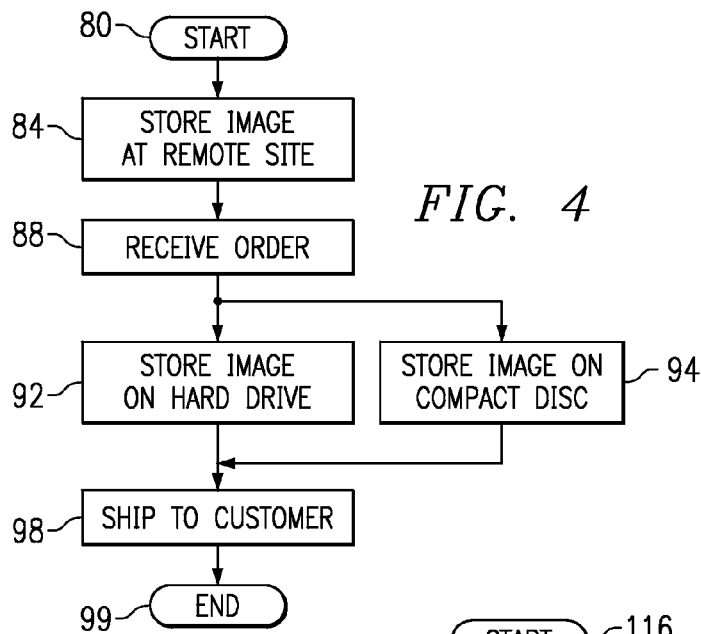
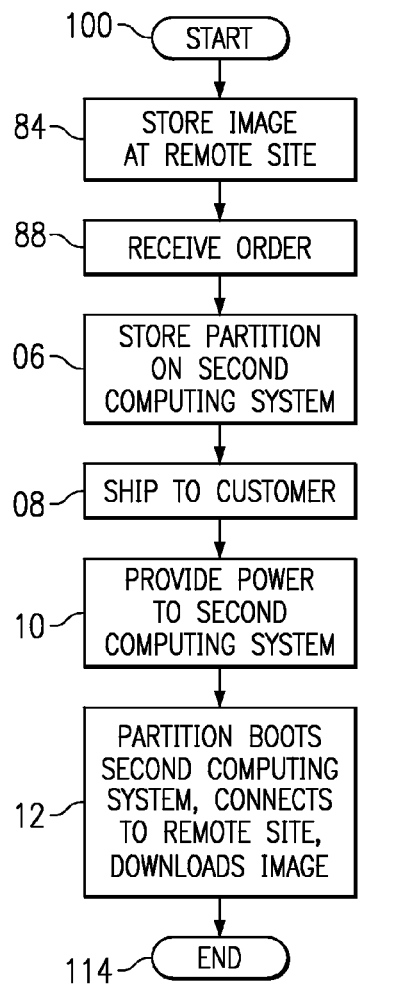
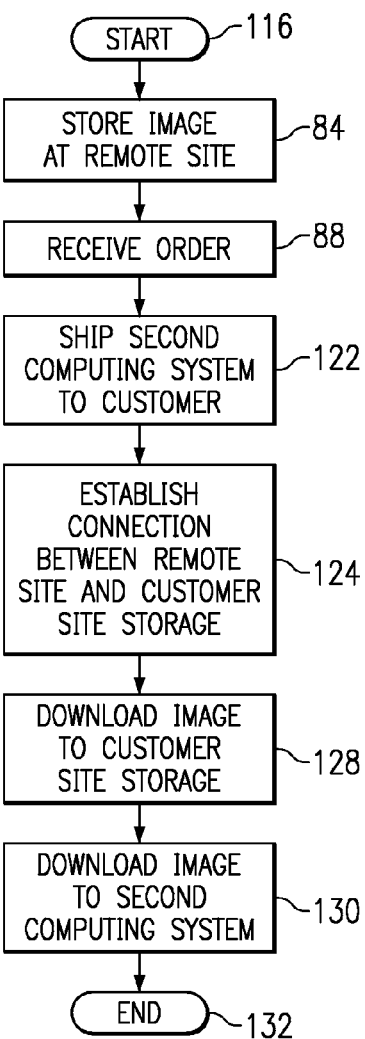
FIG. 4
FIG. 5
FIG. 6

METHOD AND SYSTEM FOR IMAGE MANAGEMENT IN A COMPUTING SYSTEM

CROSS REFERENCE TO RELATED APPLICATIONS

This application is a continuation of U.S. patent application Ser. No. 11/159,529 now U.S. Pat. No. 7,613,733, filed Jun. 23, 2005; which is a continuation of U.S. patent application Ser. No. 10/745,175 filed Dec. 23, 2003, by Edward A. Hubbard, et al., now U.S. Pat. No. 6,912,552; which is a continuation of U.S. patent application Ser. No. 09/378,020 filed Aug. 19, 1999 by Edward A. Hubbard, et al., now U.S. Pat. No. 6,760,708.

TECHNICAL FIELD

The present disclosure relates in general to storage for computing systems and, more particularly, to a method and system for migrating data to a build-to-order computing system.

BACKGROUND

A user can have several reasons for replacing an existing computing system such as a personal computer ("PC"). For example, the computing system may experience a hardware fault that requires replacement. Alternately, the user may desire to upgrade to a computing system with better performance characteristics.

Replacing an existing computing system presents a problem, however, with respect to data stored on the existing system. The user often wishes to maintain the data, and migrate the data to the new computing system.

Therefore, it is desirable for the user to have a backup, or copy, of the data stored on the existing computing system. For example, such a copy, or "image", can comprise data stored on the hard drive of an existing computing system. The user can then copy the image onto the new computing system. In such a way, a user moves his personal data to the new computing system.

However, several problems arise with this process. For example, a user cannot always predict the need to procure a new PC. A user cannot predict a failure, and it is possible such a failure will prohibit access to the user's data on the existing PC. Therefore, a user must institute a diligent backup process, such that in an event of a failure, the user can revert to the "last known good" data. Such diligence is time consuming and inconvenient.

Another problem is that storage of the backup may require large amounts of storage space, which can be cost prohibitive. Furthermore, storage of the backup on the user's premises does not protect the data from problems such as theft, fire, or corruption, that can occur at the user's premises.

Even if the customer overcomes these difficulties and maintains an image of the existing data, the copying of the image to the new computing system is labor intensive. There can be large amounts of data, requiring an inconvenient amount of time.

A related problem is the event of a software failure. It is possible that such a failure, for example an operating system ("OS") failure, will prohibit access to the user's computing system. It is further possible that replacing the OS with the last known good version will fix the failure. However, even if the user has access to an image including the last-known-good version of the OS, the failure may prevent the user from copying the image onto the computing system.

There exists conventional solutions to some of the above problems. For example, there are conventional backup utilities that can store an image of the user's computing system on tapes, floppy disks, or other removable media. There also exists a conventional backup utility that can store an image at a remote site over the Internet.

However, none of the above conventional solutions address the inconvenience encountered by a user that desires to upgrade his computing system yet maintain his own data. Furthermore, the conventional solutions do not address the situation where a software failure prevents restoring the computing system to the last known good configuration.

SUMMARY

In accordance with the present embodiment, a method and system for migrating data to a build-to-order computing system are disclosed that provide significant advantages over prior developed systems. The embodiment allows a user to upgrade to a new computing system, or repair an existing computing system, without losing existing data.

According to one aspect of the present embodiment, a method comprises storing an image at a remote site. The image comprises data stored on a first computing system. An order is received to provide a second computing system to a customer. Access to the image is provided to the second computing system such that the second computing system can store the image.

More specifically, one embodiment of the method includes storing the image on a medium integrated into the second computing system.

Another embodiment of the method comprises installing a partition on the second computing system. The partition is operable to: boot the second computing system, have the second computing system establish a connection to the remote site, and have the second computing system download the image.

According to another aspect of one embodiment, a system comprises a remote site for storing an image. The image comprises data stored on a computing system. An order engine comprises executable instructions running on a computing platform. The order engine is operable to receive an order to provide a second computing system to a customer. A storage engine interfaces with the order engine. The storage engine comprises executable instructions running on a computing platform. The storage engine is operable to provide access to the image by the second computing system such that the second computing system can store the image.

It is a technical advantage that off-site storage of an image comprising data stored on the computing system is allowed. This protects the user's data in the event of hardware failure, fire, theft, or other corruption. The off-site storage also allows for a sharing of storage resources between many users, leading to a lower cost to the user.

Another technical advantage is that storage of an image of the user's computing system can be performed periodically. This makes it easier to return to a "last known good" software state if necessary.

It is another technical advantage that a boot-to-web partition can be installed on the user's computing system. In the event the computing system experiences a failure, the computing system can boot-to-web and recover an image of the data stored on the computing system before the failure occurred. This allows a return to the "last known good" software state of the computing system.

It is a further technical advantage time is saved associated with upgrading to a new computing system. The embodiment allows a user to upgrade, change, or even duplicate an existing system, without having to take the time to load the new computing system with data from the existing computing system.

Another advantage is that an improved a "build-to-order" computer manufacturing process is possible. A manufacturer can take an order from a customer for a new computing system, and load the new computing system with an image of data particular to that customer.

Other technical advantages should be apparent to one of ordinary skill in the art in view of the specification, claims, and drawings.

BRIEF DESCRIPTION OF THE DRAWINGS

A more complete may be acquired by referring to the following description taken in conjunction with the accompanying drawings, in which like reference numbers indicate like features, and wherein:

FIG. 2 is a block diagram of one embodiment of a system for migrating data to a build-to-order computing system including user site distribution;

FIG. 3 is a block diagram of one embodiment of a system for migrating data to a build-to-order computing system including a boot to web partition;

FIG. 4 is a flow diagram of one embodiment of a method for migrating data to a build-to-order computing system;

FIG. 5 is a flow diagram of another embodiment of a method for migrating data to a build-to-order computing system; and FIG. 6 is a flow diagram of a further embodiment of a method for migrating data to a build-to-order computing system.

DETAILED DESCRIPTION

Figure 1:
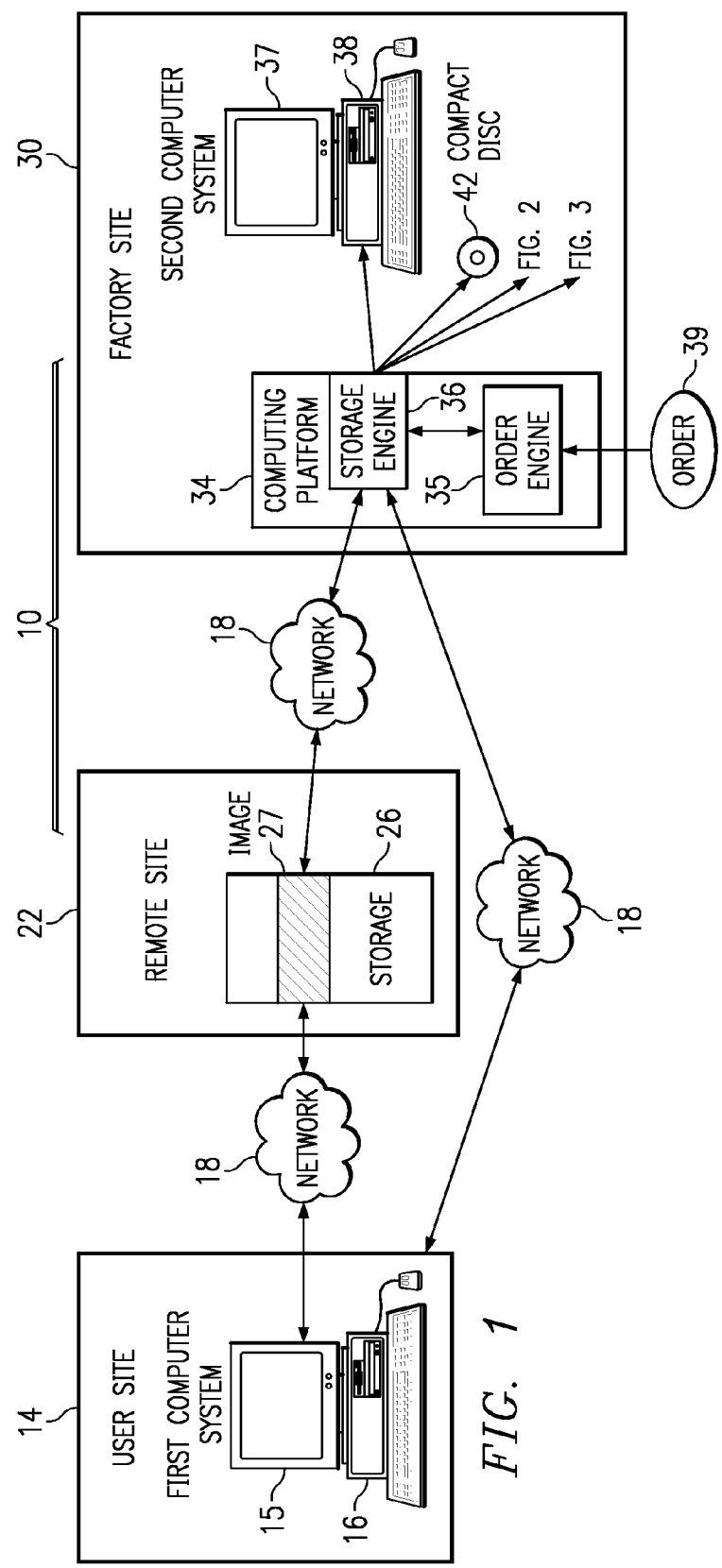
FIG. 1 is a block diagram of one embodiment of a system for migrating data to a build-to-order computing system.

FIG. 1 is a block diagram of one embodiment of a system for migrating data to a build-to-order computing system. A system, indicated generally at 10, includes a remote site 22 and a factory site 30.

A user site 14 interfaces with remote site 22 and factory site 30. A first computing system 15 resides at user site 14. In the embodiment of FIG. 1, first computing system 15 comprises a PC, including a hard drive 16 integrated into first computer system 15.

Remote site 22 includes storage 26. Factory site 30 includes computing platform 34. Computing platform can be, for example, a high end workstation, a file server, or other computing device. Executable instructions running on computing platform 34 include an order engine 35 and a storage engine 36 interfaced with order engine 35. In the embodiment of FIG. 1, as explained below, factory site 30 can also house a second computing system 37 and/or compact disc 42. Second computing system 37 can be, for example, a PC with a hard drive 38 integrated within second computing system 37.

In operation, first computing system 15 communicates with remote site 22 through a network 18. Network 18 can comprise for example, the Internet, an intranet, dedicated line, or other communication system. Such communication can occur with the use of a modem coupled to first computing system 15 and interfacing with network 18. Through such communication, remote site 22 stores an image 27 comprising data stored on hard drive 16 onto storage 26. A mechanism to uniquely identify the source of image 27 is included onto storage 26. The present embodiment can also encrypt image 27 to secure the data contained within image 27.

One example of such a storage mechanism can be a periodic, automatic update system. Periodically, such as every night or other user-definable time period, first computing system 15 creates a connection to remote site 22 and storage 26. Storage 26 then stores an image 27 of data on first computing system 15. After remote site 22 stores the first such image 27, subsequent stores can be incremental, meaning only changed data on first computing system 15 is stored into image 27. This embodiment provides several advantages to the user. The fact that image 27 is stored remote from user site 14 protects the user's data from catastrophes such as fire and theft. Additionally, the automatic nature of the on-line storage reduces the diligence required of the user and the inconvenience placed upon the user.

Further in operation, the user makes an order 39 for a second computing system. For example, the user may desire to replace first computing system 15. In the embodiment of FIG. 1, order engine 35 receives order 39. The present embodiment contemplates various methods for receiving order 39. For example, the user may place order 39 over the Internet, at a web-site communicating with order engine 35 and designed to receive such orders. Alternately, the user may phone a receiving center to place order 39. An operator at such a receiving center could communicate with order engine 35 and place order 39. Order 39 includes a unique identifier associated with first computing system 15.

Storage engine 36 interfaces with order engine 35 and provides access to image 27 by second computing system 37. The present embodiment contemplates storage engine 36 providing such access through several mechanisms.

One such mechanism is to store image 27 onto a medium integrated with second computing system 37. For example, storage engine 36 could create a connection to remote site 22 through network 18. Storage engine 36 then identifies image 27 through the unique identifier associated with first computing system 15, and communicated through order 39. Storage engine 36 then downloads image 27 and stores image 27 onto a hard drive 38 integrated into second computing system 27. Second computing system 37 can then be shipped to the user. The user now has an upgraded computing system that includes image 27 of the data from first computing system 15.

Alternately, storage engine 36 could store image 27 onto a medium accessible by second computing system 37. For example, storage engine 36 could store image 27 onto a compact disc 42. Second computing system 37 and compact disc 42 is then shipped to the user.

Further indicated by FIG. 1 is an alternate embodiment whereby first computing system 15 communicates with factory site 30 through network 18. In such an embodiment, factory site 30 can store image 27, for example on computing platform 34.

As indicated by FIG. 1, FIGS. 2 and 3 discuss further alternate mechanisms for providing access to image 27 by second computing system 37.

FIG. 1 further shows the applicability of the present embodiment to a computer manufacturer using a build-to-order process. In such a process, a customer orders a build-to-order computer with a customized configuration. For example, the customized configuration may include specific hardware types as well as specific software applications. The manufacturer assembles the build-to-order computer to these customized configuration instructions, and loads the software applications desired by the customer. Furthermore, through the present embodiment, the manufacturer also loads onto the build-to-order computer an image of the customer's own data. Such a system reduces greatly the inconvenience experienced by a customer desiring to replace an existing computer.

FIG. 2 is a block diagram of one embodiment of a system for data migration including user site distribution. A system 11 includes remote site 22 in communication with a user site 50 over network 18. Customer site 50 includes a customer site storage 54 and a plurality of second computing systems 58. This embodiment may be representative, for example, of a large PC roll out into a corporate customer site 50.

In operation, image 27 is stored at remote site in storage 26, as in the embodiment of FIG. 1. However, system 11 waits until second computing systems 58 arrive at customer site 50 before loading image 27 onto second computing systems 58. System 11 first downloads image 27 to customer site storage 54, and then customer site storage 54 distributes image 27 to the appropriate second computing system 58. By such a system, a large number of images 27 can be stored at remote site 22, the images corresponding to a customer's different computers. The customer then orders a new group of second computing systems 58, and places them where desired. Customer site storage 54 then downloads and directs the appropriate image 27 for each second computing system 58.

FIG. 3 is a block diagram of one embodiment of a system for migrating data to a build-to-order computer including a partition. In the embodiment of FIG. 3, system 12 includes factory site 30 and remote site 22, as in the embodiment of FIG. 1. Factory site 30 includes computing platform 34, order engine 35, and storage engine 36.

In operation, as in the embodiment of FIG. 1, remote site 22 stores image 27 of a first computing system, and a unique identifier associated with image 27. A customer places order 39 and order engine 35 receives such an order. However, in the embodiment of FIG. 3, storage engine 36 installs a partition 64 onto a second computing system 60. The unique identifier of image 27 can also be integrated into partition 64 by storage engine 36.

Partition 64 can comprise, for example, a boot-to-web partition. One such partition could include the functionality as described in U.S. patent application Ser. No. 09/377,726, entitled "Method and System for Automated Technical Support for Computers", filed by Thomas Vrhel, Jr., et al. on Aug. 19, 1999, now U.S. Pat. No. 6,560,726 which is incorporated herein by reference.

Further in operation, second computing system 60 is shipped to customer site 59. Once at customer site 59, a user applies power to second computing system 60. Partition 64 recognizes a condition that has been set at factory site 30. For example, the condition can include the unique identifier associated with image 27. Partition 64 boots second computing system 60 and establishes a connection to remote site 22. For example, partition 64 could include a skeleton operating system operable to operate a modem and connect second computing system 60 to remote site 22. Second computing system 60 can then download and store image 27.

In addition to the convenience offered to a user for upgrading a computing system, the embodiment of FIG. 3 offers other advantages. For example, partition 64 could operate to detect when a software failure occurs on second computing system 60. Partition 64 could then operate second computing system 60 to download image 27 that corresponds to a last-known-good version of the data on second computing system 60. After downloading image 27, partition 64 could reboot second computing system 60 and return it to its previous functionality. In such a way, the embodiment of FIG. 3 provides a more robust system to a user. Alternatively, partition 64 could first inquire if the user desires to download image 27.

FIG. 4 is a flow diagram of one embodiment for method of migrating data to a build-to-order computing system. The method of FIG. 4 begins at step 80. At step 84, an image is stored at a remote site. The image comprises data stored on a first computing system. As discussed above, the storing of such an image can occur automatically and periodically in order to reduce inconvenience to a user. Furthermore, such a storage can include encrypting the image for security.

At step 88, an order is received to provide a second computing system to the user. The order can include, for example, a request that the image be provided to the second computing system that has been ordered. The order also includes a unique identifier associated with the image.

Step 92 and 94 provide alternate methods for providing access to the image by the second computing system. In step 92, the image is stored on a medium integrated with the second computing system. For example, the medium can comprise a hard drive integrated into the second computing system. At step 94, the image is stored on a medium accessible by the second computing system but not integrated with the second computing system. For example, at step 94 a image can be stored on a compact disc.

At step 98 the second computing system is shipped to the customer. If progressing from step 94, the compact disc is shipped with the second computing system. Therefore, by the end of the method at step 99, the customer receives the second computing system which includes the data that from the user's previous system.

FIG. 5 is a flow diagram of another method for migrating data to a build-to-order computer. The method begins at step 100. Steps 84 and 88 are equivalent to those shown in FIG. 4, in which an image comprising data stored on a first computing system is stored and an order is received for a second computing system.

At step 106, a partition is installed on the second computing system. The partition is operable to boot the second computing system and have the second computing system establish a connection to the remote site. Further, as discussed with respect to partition 64 of FIG. 3, the partition can recognize a condition wherein the partition should boot the second computing system and establish a connection to the remote site. The partition is further operable to have the second computing system download the image.

At step 108 the second computing system which includes the partition is shipped to the customer. At step 110, the user provides power to the second computing system. At step 112 the partition boots the second computing system, establishes a connection to the remote site, and downloads the image such that the image is stored on the second computing system. The method ends step 114 wherein the user has in his possession a computing system that includes the image of data from the user's previous computing system.

FIG. 6 is a flow diagram of a further method for migrating data into a build-to-order computing system. The method begins at step 116. As in the other FIGUREs, steps 84 and 88 include storing an image of a first computing system to a remote site and receiving an order for a second computing system. At step 122, the second computing system is shipped to the customer.

At step 124, a connection is made between a customer site storage and the remote site. For example, the customer site storage can comprise a server or other user site storage system. At step 128, the image is downloaded from the remote site to the customer site storage. At step 130, the image is downloaded from the customer site storage to the second computing system. The method ends at step 132.

The method of FIG. 6 may be appropriate, for example, when providing a plurality of computing systems to a single user.

The advantages of the present embodiment include providing a build-to-order computing system to a user, while maintaining the user's data from a previous computing system. Additionally, the present embodiment provides such a build-to-order computing system with a minimum of inconvenience to the user.

Although the present embodiment has been described in detail, it should be understood that various changes, substitutions and alterations can be made thereto without departing from the spirit and scope of the appended claims.

What is claimed is:

1. A method comprising:
    booting a computing system from a partition installed on the computing system;
    establishing communication between the computing system and a remote site, wherein the remote site includes an image comprising data stored on the computing system; and
    transferring the image from the remote site to a storage medium of the computing system.

2. A method according to claim 1, wherein at least one of the booting, establishing, and downloading steps is performed in response to a failure of the computing system.

3. A method according to claim 1, wherein the image comprises a last known good software state of the computing system.

4. A method according to claim 1, wherein the transferring of the image from the remote site returns the computing system to a last known good software state of the computing system.

5. A method according to claim 1, wherein transferring the image includes transferring the image via the World Wide Web.

6. A method according to claim 1, wherein transferring the image includes transferring the image via an intranet.

7. A method according to claim 1, wherein transferring the image includes transferring the image via the Internet.

8. A method for upgrading a computing system comprising:
    storing an image at a remote site, the image comprising data stored on the computing system; and
    storing the image to a second computing system communicatively coupled to the remote site.

9. A method according to claim 8, further comprising communicatively coupling the remote site to the second computing system via an intranet.

10. A method according to claim 8, further comprising communicatively coupling the remote site to the second computing system via the Internet.

11. A method according to claim 8, further comprising communicatively coupling the remote site to the first computing system.

12. A method according to claim 11, wherein storing the image at a remote site comprises transferring the image from the first computing system to the remote site.

13. A method according to claim 11, wherein the first computing system and second computing system are located at a site remote from the remote site.

14. A method according to claim 8, wherein storing the image to the second computing system comprises transferring the image from the remote site to the second computing system.

15. A computing system comprising:
    a processor;
    a computer readable medium coupled to the processor and having stored thereon a partition having executable instructions configured to, when executed by the processor:
        boot the computing system;
        establish communication between the computing system and a remote site communicatively coupled to the computing system, wherein the remote site includes an image comprising data stored on the computing system; and
        transfer the image from the remote site to the computer-readable medium.

16. A computing system according to claim 15, wherein the executable instructions are further configured to perform at least one of the booting, establishing, and downloading steps in response to a failure of the computing system.

17. A computing system according to claim 15, wherein the image comprises a last known good software state of the computing system.

18. A computing system according to claim 15, wherein the remote site is communicatively coupled to the computing system via the World Wide Web.

19. A computing system according to claim 15, wherein the remote site is communicatively coupled to the computing system via an intranet.

20. A computing system according to claim 15, wherein the remote site is communicatively coupled to the computing system via the Internet.

* * * * *